United States Patent [19]
Jones et al.

[11] 3,930,854
[45] Jan. 6, 1976

[54] ELECTROSTATIC COPY PAPER CONTAINING MANGANOUS SALT

[75] Inventors: Edgar L. Jones, Prospect Heights; Leonard Laskin; Phillip E. Sokol, both of Chicago, all of Ill.

[73] Assignee: DeSoto, Inc., Des Plaines, Ill.

[22] Filed: July 3, 1974

[21] Appl. No.: 485,647

Related U.S. Application Data

[63] Continuation of Ser. No. 677,739, Oct. 24, 1967, abandoned.

[52] U.S. Cl. .................. 96/1.8; 96/1.7; 252/501
[51] Int. Cl.$^2$ .......................................... G03G 5/08
[58] Field of Search ................ 96/1.5, 1.6, 1.7, 1.8; 252/501

[56] References Cited
UNITED STATES PATENTS

| | | | |
|---|---|---|---|
| 3,037,861 | 6/1962 | Hoegl et al. | 96/1.5 |
| 3,197,307 | 7/1965 | Blake et al. | 96/1.8 |
| 3,553,009 | 1/1971 | Hoegl et al. | 96/1.5 |

*Primary Examiner*—David Klein
*Assistant Examiner*—Judson R. Hightower
*Attorney, Agent, or Firm*—Dressler, Goldsmith, Clement & Gordon, Ltd.

[57] ABSTRACT

Print contrast in zinc oxide-coated electrostatic copy paper is improved by the incorporation of small quantities of manganous chloride or manganous bromide.

9 Claims, No Drawings

ELECTROSTATIC COPY PAPER CONTAINING MANGANOUS SALT

This is a continuation of application Ser. No. 677,739, filed Oct. 24, 1967, now abandoned.

The present invention relates to electrostatic copy paper which has been modified to accept a greater static charge in the dark and to possess greater conductivity when exposed to light so that prints of better contrast, e.g., having darker images and brighter backgrounds, can be obtained therefrom.

The standard electrostatic copy paper comprises a sheet of electrically conductive paper having a surface coated with a layer of finely divided zinc oxide in a resin binder. Such a layer is insulating in the dark, because the resin is an insulator and the zinc oxide is non-conductive in the dark, and thus is able to retain an electrostatic charge. However, when the zinc oxide is exposed to light it becomes conductive and the electrostatic charge is discharged through the paper. If the charged paper is exposed to light reflected from a printed page, then only the unprinted areas of the printed page will reflect the light, and only the corresponding areas on the copy sheet will be exposed. Thus, the charge is retained in the unexposed areas that correspond to the print on the original and this charge can be used to attract and hold a printing powder which may be fixed, if needed to form a copy of the original printed page.

One problem with zinc oxide-coated papers is that when the paper is exposed, the zinc oxide-containing layer becomes inadequately conductive so that the electrostatic charge is not completely discharged. The residual charge attracts particles of printing powder producing a gray background. If the exposure is increased to whiten the background, then the printed areas become lighter. If the exposure is decreased to darken the printed areas, then the background becomes darker. In any event, little change in overall contrast is achieved.

As will be evident, anything that makes the zinc oxide layer a better insulator improves the darkness of the print at the expense of the whiteness of the background. Correspondingly, anything that makes the zinc oxide layer a better conductor improves the background whiteness at the expense of the darkness of the print. It is therefore surprising to find that the modified electrostatic copy papers of the invention have both an increased ability to accept and retain an electrostatic charge in the dark and a greater conductivity when exposed to light to provide improved print contrast.

In accordance with the present invention, a zinc oxidecontaining coating composition for electrostatic copy paper is modified by the incorporation of manganese salts in which the manganese is in the manganous or +2 oxidation state. In the invention, the chloride and bromide salts are used since these, and especially the chloride salt are uniquely superior. The amount of manganese salt is small, from 50 to 400 parts per million (measured as manganese metal), based on the zinc oxide, but in these proportions there is provided a good balance between the increased retention of charge in the dark and conductance to discharge the charge when exposed to light providing improved contrast.

It should be recognized that the manganous salt can be added to the zinc oxide or to the binder resin solution. Appropriate proportions of salt in the binder resin solution are 250 to 4,000 parts per million of manganese, based on dry resin. This assumes a typical pigment to binder ratio of from 5:1 to 10:1. Again, the preferred proportion within the range will vary with the salt selected. Also, the manganous salt may be incorporated into the photoconductive coating in various ways, e.g., by incorporating the salt into the resin solution or into the pigmented coating solution and even by applying the salt onto the zinc oxide prior to incorporation thereof into the coating solution.

It is desired to stress that the invention includes the organic solvent solutions of resin and manganous salt both before and after zinc oxide pigmentation as well as the broad step of incorporating the manganous salt in the photoconductive coating on the paper and the modified photoconductive paper which is produced.

While any film-forming organic resin may be used as the binder, some classes of resins are superior for the formation of photoconductive coatings, as follows:

1. copolymers containing a significant proportion of styrene, e.g., at least 3% by weight.
2. copolymers containing a significant proportion of $C_1 - C_{20}$ alkyl esters of acrylic, methacrylic and crotonic acids, e.g., at least 30% by weight.
3. copolymers containing a significant proportion of vinyl acetate, e.g., at least 30% by weight.
4. alkyd resin copolymerized with at least 30 % by weight of styrene.
5. mixtures of the foregoing.

Preferably, a significant proportion identifies a major proportion, e.g., at least 50%.

The foregoing are illustrated by copolymers of styrene and 2-ethylhexyl acrylate in weight proportions of 70:30 to 30:70 to which may be added up to 3% by weight of an acid such as acrylic acid or methacrylic acid, and copolymers of ethyl acrylate and vinyl acetate in a weight ratio of 50:50. From the standpoint of an appropriate alkyd resin, a drying oil modified alkyd is used to enable copolymerization with styrene, this being illustrated by an alkyd formed of phthalic anhydride, glycerine, and linseed oil fatty acids in a mole ratio of 5 moles of phthalic anhydride, 4 moles of glycerine, and 2 moles of linseed fatty acids, and copolymerized with 50 parts of styrene per 100 parts of oil modified alkyd.

Mixtures of the foregoing are illustrated by equiweight mixtures of any two or more of the different classes of materials noted, especial preference being had for a mixture comprising a copolymer consisting essentially of styrene and unsaturated ester as previously defined in admixture with a vinyl acetate containing copolymer. It is also broadly permissible to incorporate alkyd resins and aminoplast resins in the mixtures described hereinbefore.

The resin binder is preferably used in organic solvent solution in any of the common inert solvents such as toluene, benzene, xylene, methyl ethyl ketone, butanol, and mixtures thereof. A typical solvent system is exemplified by a 50:50 weight ratio mixture of xylene and toluene. Alcoholic solvents and especially n-propanol are desirably present in amounts of 5–40% based on the total weight of solvent, but larger amounts are not preferred.

The zinc oxide which is incorporated into the resin binder solution is preferably in an extremely fine state of subdivision as is well known in the art, a Hegman N. S. value of 5 in the pigmented resin solution being typical of preferred practice.

The proportion of zinc oxide in the binder solution may vary within broad limits, the only restrictions being that the amount must be sufficient to provide adequate conductivity in the film upon exposure to light and yet allow sufficient binder to maintain the integrity of the film. Broadly speaking, a zinc oxide to binder ratio of at least 4 to 1 and preferably of at least 5 to 1 is desirable to provide the desired conductivity upon exposure; however, a zinc oxide to binder ratio of up to 30 to 1 allows sufficient binder to maintain a degree of film integrity, although the ratio is preferably less than 10 to 1.

The photoconductive coating is also desirably formulated to include certain sensitizers to render the coatings adequately photoconductive over the range of visible light. Examples of sensitizers are sodium fluorescein, methylene blue, and brom phenol blue, these being merely illustrative and not forming any part of the present invention which does not directly depend upon the wave length of light used for exposure or the agents used as sensitizers.

The photoconductive coating is primarily intended to be applied from organic solvent solution; however, application from aqueous emulsion is also possible and is contemplated since the manganous salt in the final coating will function no matter how it is incorporated therein. The organic solvents used for the solvent solution application are the same as those noted hereinbefore.

The photoconductive coating solution is formulated to provide a high non-volatile solids content of at least 50% preferably at least 55%, but this is of secondary importance.

The invention will be illustrated in the Example which follows, it being understood that all parts are by weight throughout the present application.

EXAMPLE

A zinc oxide-resin binder coating composition is made by mixing, at a pigment to binder ratio of 6 to 1, zinc oxide and a solution copolymer composed of 69% styrene, 30% 2-ethylhexyl acrylate, and 1% acrylic acid in a xylene-toluene (50:50 weight ratio mixture) solvent. The coating composition is formulated to contain 60% non-volatile solids and is ground in a Waring Blendor to grind rating of Hegman N.S.-5. The coating is sensitized with 16 ppm brom phenol blue, 35 ppm sodium fluorescein, and 8 ppm methylene blue, based on the zinc oxide. Three samples are produced at three different manganese salt concentrations, namely, 100 ppm. 200 ppm. and 400 ppm, based on zinc oxide, from a solution of manganous chloride. $4H_2O$ ($MnCl_2 \cdot 4H_2O$) in n-propanol (4% concentration).

These three solutions are drawndown on a conductive base paper, dark adapted overnight in a 45–50% relative humidity environment, and evaluated for electrical and print quality. The electrical data compared against a control containing no manganous chloride appear in the following table:

EFFECTS OF $MnCl_2$ ON ELECTRICAL PROPERTIES OF COATING

| Level of Manganese added as $MnCl_2$ (ppm) | Charge Acceptance (Volts) | Relative Speed[1] | Coating Weight (lb/3000 ft²) |
| --- | --- | --- | --- |
| 0 | 550 | 0.57 | 21.5 |
| 100 | 580 | 0.82 | 20.7 |
| 200 | 583 | 0.73 | 20.6 |
| 400 | 555 | 0.74 | 19.8 |

[1] Relative speed is a measure of the rate of the light decay of the charged coated paper, extrapolated linearly to that of a sheet charged to a potential of 400 volts.

Prints made from the maganous salt-containing photoconductive papers are superior as evidenced by increased image density and clearer background.

The invention is not to be construed by any abstract of disclosure, but its features are instead characterized in the description given hereinbefore and is defined in the claims which follow.

We claim:

1. An organic solvent solution coating composition comprising an inert organic solvent having dissolved therein a resin binder selected from the group consisting of:
   1. copolymers containing at least 30% by weight of copolymerized styrene;
   2. copolymers containing at least 30% by weight of $C_1 - C_{20}$ alkyl esters of copolymerized acrylic, methacrylic and crotonic acids;
   3. copolymers containing at least 30% by weight of copolymerized vinyl acetate;
   4. alkyd resins copolymerized with at least 30% by weight of styrene; and
   5. mixtures of the foregoing; said solution further containing from 250 to 4000 parts per million of manganese, based on the weight of the resin, in the form of manganous salt selected from the group consisting of manganous chloride and manganous bromide.

2. An organic solvent solution coating composition as recited in claim 1 further including finely divided zinc oxide present in a weight ratio with respect to said resin binder of from 4:1 to 30:1.

3. An organic solvent solution coating composition as recited in claim 1 in which manganous salt is manganous chloride.

4. An organic solvent solution coating composition as recited in claim 1 in which said organic solvent comprises from 5–40% of n-propanol, based on the total weight of solvent.

5. An electrostatic copy paper comprising a sheet of electrically conductive paper having a surface thereof coated with a photoconductive coating, said coating comprising finely divided zinc oxide particles dispersed in an insulating resin binder, and said coating having incorporated therein from 50 to 400 parts per million of manganese, based on the weight of said zinc oxide, in the form of manganous salt selected from the group consisting of manganous chloride and manganous bromide.

6. An electrostatic copy paper as recited in claim 5 in which said manganous salt is manganous chloride.

7. an electrostatic copy paper as recited in claim 5 in which said photoconductive coating further includes a small proportion of dye sensitizers to improve sensitivity to visible light.

8. An electrostatic copy paper as recited in claim 5 in which said zinc oxide is present in a weight ratio with respect to said resin binder of from 5:1 to 10:1.

9. An electrostatic copy paper as recited in claim 5 in which said resin binder is selected from the group consisting of:
1. copolymers containing at least 30% by weight of copolymerized styrene;
2. copolymers containing at least 30% by weight of copolymerized $C_1 - C_{20}$ alkyl esters of acrylic, methacrylic and crotonic acids;
3. copolymers containing at least 30% by weight of copolymerized vinyl acetate;
4. alkyd resins copolymerized with at least 30% by weight of styrene; and
5. mixtures of the foregoing.

* * * * *

Disclaimer 3,930,854.—*Edgar L. Jones*, Prospect Heights, and *Leonard Laskin* and *Phillip E. Sokol*, Chicago, Ill. ELECTROSTATIC COPY PAPER CONTAINING MANGANOUS SALT. Patent dated Jan. 6, 1976. Disclaimer filed Dec. 16, 1977, by the assignee, *DeSoto, Inc.*

Hereby enters this disclaimer to claims 1 and 3 of said patent.

[*Official Gazette March 14, 1978.*]